No. 783,600. Patented February 28, 1905.

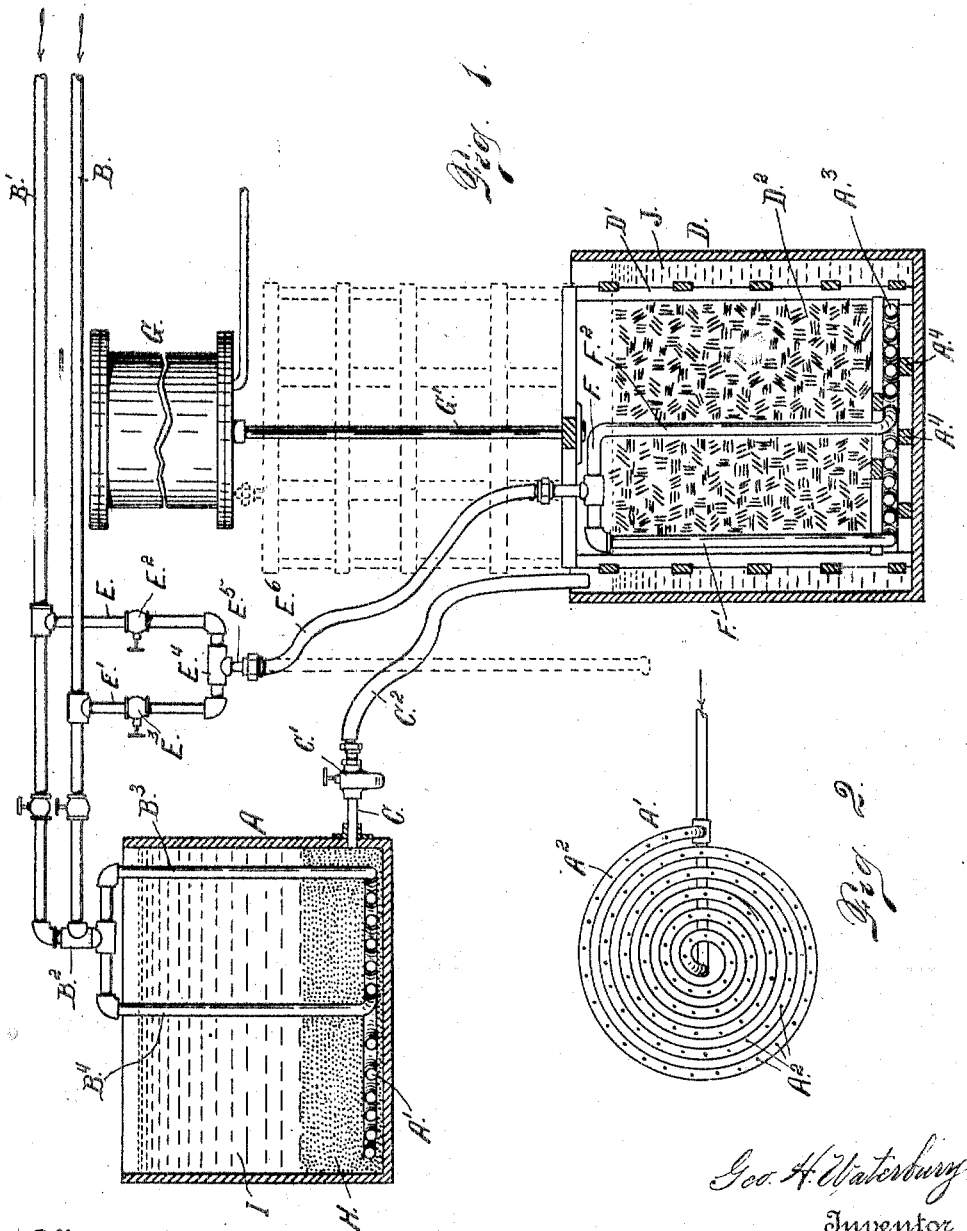

UNITED STATES PATENT OFFICE.

GEORGE H. WATERBURY, OF DENVER, COLORADO, ASSIGNOR TO THE WATERBURY METALS EXTRACTION COMPANY, OF SPOKANE, WASHINGTON.

PROCESS OF EXTRACTING COPPER FROM ORES.

SPECIFICATION forming part of Letters Patent No. 783,600, dated February 28, 1905.

Application filed April 18, 1904. Serial No. 203,747.

*To all whom it may concern:*

Be it known that I, GEORGE H. WATERBURY, a citizen of the United States of America, residing in the city and county of Denver and State of Colorado, have invented certain new and useful Improvements in Processes for the Extraction of Copper from Ores; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved process for the extraction of copper from ores.

In carrying out my improved process I employ two steps—namely, first, the leaching step, and, second, the precipitating step. The leaching step consists in dissolving the copper or placing it in solution, while the precipitating step consists in settling the dissolved copper. The ore is first prepared by pulverizing it to a suitable mesh. This pulverized ore is placed in a tank containing a solution of sulfurous acid, to which is added a comparatively small quantity of sulfuric acid. The water should be saturated with the sulfurous acid, which is comparatively cheap; but a small quantity of the sulfuric or more expensive acid is required. After the ore is placed in this solution air and steam are introduced at the bottom of the tank through the instrumentality of suitable apparatus, whereby the combined fluid is forced up through the ore, with the result that the copper is extracted or dissolved. This extraction of the copper requires from twenty to sixty minutes approximately, depending on the nature of the ore and other conditions. The union of the steam with the air heats the volume of air in a much more satisfactory and economical way than can be accomplished in any other manner. It is evident that the instant the steam and air enter the tank the air will immediately expand and pass rapidly upwardly through the ore in the tank. This action of the air produces the necessary agitation whereby the particles of ore are brought into direct and immediate contact with the acid, whereby the extraction or dissolving of the copper is effected. As soon as the leaching operation is complete the solution is drawn off into a precipitating-tank containing particles of metal, as aluminium or steel. This metal may be placed in a precipitating-tank in any desired form, as in sheets or smaller particles. The form must, however, be such that the solution is allowed to circulate freely therethrough. Air and steam are then introduced at the bottom of the precipitating-tank and caused to pass up through the copper solution, whereby the copper is precipitated or caused to settle on the bottom of the tank.

In the carrying out of my improved process I employ suitable apparatus, which will now be described, though it must be understood that I do not limit the invention to the said apparatus shown; neither is there anything claimed in this application on the said apparatus.

Referring to the accompanying drawings, Figure 1 is a view of an apparatus for carrying out the process, the two tanks—namely, the leaching-tank and the precipitating-tank—being shown in central vertical section. Fig. 2 is an underneath view of the pipe-coil located in the bottom of either tank, showing the perforations through which the air and steam pass into the solution.

The same reference characters indicate the same parts in both views.

Let A designate the leaching-tank, in the bottom of which is placed a pipe-coil A', perforated on its under side, as shown at $A^2$. (See Fig. 2.) Air from a pipe B and steam from a pipe B' are introduced into the tank in any suitable manner. As shown in the drawings, these two pipes unite at $B^2$, where the air and steam join. The air and steam then pass through two pipes $B^3$ and $B^4$, the said pipes being respectively connected with the opposite extremities of the perforated coil A', whereby the air and steam are introduced into the bottom of the tank. The solution from the tank A passes therefrom to a valved outlet C, controlled by a valve C', to a conduit $C^2$ and thence into the precipitating-tank D, having a cage D' containing metal $D^2$ in a sufficiently-divided form to enable the solution to circulate freely therethrough. Connected with the air and steam pipes B and B' are branches E and E', provided with valves $E^2$ and $E^3$. The air and steam from these pipes unite at $E^4$ and pass through a suitable outlet $E^5$ into a conduit $E^6$, which connects at its lower extremity with a pipe F, having two downwardly-extending branches F' and $F^2$, whose lower extremities are connected with the opposite extremities of the perforated coil $A^3$, which is substantially of the construction shown in Fig. 2, the perforations of the coil being preferably located on the under side. The coil $A^3$ is preferably supported by means of slats $A^4$, placed upon the bottom of the tank D, whereby the coil is sufficiently supported from the bottom of the tank to enable the air and steam to escape freely therefrom and pass upwardly through the metal. If desired, steam alone may be introduced into the precipitating-tank.

In the drawings a hydraulic cylinder G may be employed for lifting the cage D' out of the precipitating-tank or to the position shown by dotted lines in Fig. 1. A piston (not shown) located within the hydraulic cylinder is connected, by means of a rod G', with the said cage, whereby the latter may be lifted and the metal or contents of the cage raised out of the precipitating-tank at pleasure.

In the leaching-tank, H designates the ore, and I the solution of the tank, while in the precipitating-tank J designates the solution. I prefer to use aluminium as the metal in the precipitating-tank, as better results are obtained from the use of this particular metal.

The precipitating process described in this specification is not claimed herein, having been divided out and made the subject-matter of a new application.

Having thus described my invention, what I claim is—

1. A process of extracting copper from ore, consisting first in pulverizing the ore to a suitable mesh, placing it in a solution of sulfurous and sulfuric acid, and finally introducing air and steam at the bottom of the receptacle containing the solution and ore.

2. The herein-described process of extracting copper from ores, consisting first in placing the suitable pulverized ore in a tank containing a solution of sulfurous and sulfuric acid, introducing air and steam to the solution under suitable pressure, drawing off the solution from the leaching-tank into a precipitating-tank containing metal sufficiently divided to allow the solution to circulate therethrough, and finally introducing steam, or air combined with steam to the precipitating-tank whereby the copper is caused to settle in the tank.

3. A process of leaching copper ore comprising placing the suitably-pulverized ore in a solution of sulfurous and sulfuric acid, and subjecting the pulp thus formed to agitation, by introducing air and steam at the bottom of the receptacle.

4. A process of leaching copper ore comprising placing the suitably-pulverized ore in a solution of sulfurous and sulfuric acid, and subjecting the pulp thus formed to agitation by the introduction of air and steam to the pulp mass.

5. A process of leaching copper ore, consisting in placing the suitably-pulverized ore in a solution formed by saturating water with sulfurous acid and adding thereto a comparatively small quantity of sulfuric acid, and subjecting the mass thus formed to agitation.

6. A process of extracting copper from ore, consisting in placing the suitably-pulverized ore in a solution composed of water saturated with sulfurous acid and containing a comparatively small quantity of sulfuric acid, subjecting the mass to agitation until the copper is dissolved, drawing off the solution containing the copper and placing it in a receptacle containing metal sufficiently divided to allow the solution to circulate therethrough, and subjecting the solution to agitation until the copper is precipitated.

In testimony whereof I affix my signature in presence of two witnesses.

GEORGE H. WATERBURY.

Witnesses:
 DENA NELSON,
 A. J. O'BRIEN.